United States Patent Office

3,632,532
Patented Jan. 4, 1972

3,632,532
PRODUCTION OF EXPANDED ETHYLENE COPOLYMERS
Rudolf Gaeth and Helmut Pfannmueller, Limburgerhof, Pfalz, Fritz Stastny, Ludwigshafen (Rhine), Hans-George Trieschmann, Hambach, Hermann Tatzel, Ludwigshafen (Rhine), and Johann Zizlsperger, Frankenthal, Pfalz, Germany, assignors to Badische Anilin- & Soda-Fabrik Aktiengesellschaft, Ludwigshafen (Rhine), Germany
No Drawing. Filed Aug. 14, 1968, Ser. No. 752,455
Claims priority, application Germany, Aug. 16, 1967,
P 16 69 713.5
Int. Cl. C08v 1/26
U.S. Cl. 260—2.5 R                      10 Claims

ABSTRACT OF THE DISCLOSURE

Production of expanded materials by mixing copolymers of ethylene with polyisocyanates and expanding agents under pressure and decompressing the homogeneous mixtures.

---

This invention relates to a process for the production of expanded ethylene copolymers having crosslinked constituents.

Various methods are known for the production of expanded ethylene copolymers. In one process which has been introduced into industry the copolymers are mixed in continuous equipment, for example in an extruder, in the molten condition with a liquid or gaseous expanding agent, for example an aliphatic hydrocarbon or a fluorocarbon compound, and the resultant homogenous gel is extruded through a die. After the gel has left the die it expands under the vapor pressure of the expanding agent. Copolymers of ethylene with vinyl esters/and or acrylic esters are used for the production of particularly soft foams. The foams obtained using such copolymers have a relatively low softening point so that the thermal stability is relatively low and this is often troublesome when the foams are used as upholstery materials.

It is also known that the thermal stability of expanded polymers can be increased by crosslinking the polymers. Thus for example expanded polymers can be improved by incorporating and decomposing peroxides or be treated with high energy radiation. It is a drawback of this method, however, that the crosslinked products are not thermoplastic so that it is not possible to process such crosslinked products by continuous methods, for example in an extruder, into expanded plastics.

There has therefore been the problem of preparing soft and elastomeric foams having relatively high thermal stability.

It is an object of this invention to provide expanded plastics which have high thermal stability and which are soft and elastomeric.

The object of the invention is achieved by mixing, at a pressure which is higher than that of the expanding agent at the mixing temperature, (a) a copolymer of ethylene and a vinyl ester or an ester of an unsaturated acid which is copolymerizable with ethylene with (b) a polyisocyanate and (c) an expanding agent and decompressing the mixture.

Copolymers of ethylene with vinyl esters and/ or esters of unsaturated acids which are copolymerizable with ethylene and which contain at least 60% by weight of polymerized units of ethylene are suitable for the process. Examples of suitable comonomers are vinyl esters of acids having two to five carbon atoms or esters of unsaturated acids with alcohols having one to twenty carbon atoms. Foams of copolymers of ethylene with vinyl acetate or acrylic esters have advantageous properties. Ethylene copolymers which contain (besides the said esters) preferably 10 to 20% by weight of polymerized units of the particular unsaturated acid such as acrylic acid, crotonic acid, fumaric acid or maleic acid, are also suitable. For example copolymers of ethylene which contain 5 to 10% of polymerized units of acrylic acid and 5 to 10% of polymerized units of tert-butyl acrylate are suitable, particularly for the production of soft foams having high thermal stability.

Hydrocarbons, halohydrocarbons and chlorofluorocarbons whose boiling points are from 25° to 150° C. lower than the melting point of the copolymer are suitable as expanding agents for the ethylene copolymers. Melting point in the present context is the crystallite melting point. Examples of suitable expanding agents are aliphatic or olefinic hydrocarbons having three to five carbon atoms such as propane, butane and pentane or propene, butene and pentene. Isobutane or hydrocarbons having five to seven carbon atoms and at least two lateral methyl groups whose boiling points are from −10° to +60° C. have particular importance as expanding agents. Examples are neopentane and 2,2-dimethylbutane. Among the halohydrocarbons, those having one or two carbon atoms such as methyl chloride, ethyl chloride and dichloromethane are particularly suitable.

Dichlorodifluoromethane, fluorotrichloromethane, monofluorochloromethane, 1,2,2-trifluorotrichloroethane and 1,1,2,2-tetrafluorodichloroethane are suitable chlorofluorocarbons.

The amount of expanding agent used is such that the mixtures of thermoplastic ethylene copolymers and expanding agents contain 15 to 35% by weight of expanding agent with reference to the copolymer. The amount of expanding agent depends on the desired density of the expanded ethylene copolymer and the pressure and temperature conditions during processing. Besides the said expanding agents it is also possible sometimes to use solid expanding agents which eliminate gas, either alone or in combination with the above liquid expanding agents.

Solid expanding agents which decompose at the expansion temperature with the formation of gaseous product include substances which eliminate nitrogen such as azo compounds, for example azodicarboxamide or azoisobutyronitrile or aromatic sulfohydrazides.

The ethylene copolymers are advantageously mixed with 0.5 to 5%, preferably 1 to 2%, by weight of polyisocyanates with reference to the weight of the copolymers.

Aliphatic and aromatic diisocyanates such as hexamethylene-1,6-diisocyanate, diphenylmethane-4,4-diisocyanate, naphthylene-1,5-diisocyanate and toluylene-2,4-diisocyanate are particularly suitable polyisocyanates.

4,4'-dicyclohexylmethane diisocyanate and 3,3'-dimethyl-4,4'-dicyclohexylmethane diisocyanate are especially suitable.

The residence time of the mixtures of copolymers and polyisocyanates in the mixing zone is advantageously from two to thirty minutes.

Substances known as nucleating agents may be added to the mixtures to prepare expanded plastics having particularly finely cellular structure. Examples of suitable nucleating agents are finely powdered silicates, such as talc, which are most advantageously used in amounts of 1 to 3% by weight with reference to the copolymer.

In addition to the copolymer, polyisocyanate and expanding agent, the mixtures may contain other components such as fillers, dyes, flame retardants, antistatic agents, stabilizers, slip additives or other polymers. Examples of such other polymers are polyethylene, polypropylene, polybutene and polysiobutene, and these may be added to the mixtures in amounts of up to 40% by weight with reference to the copolymer.

The thermoplastic ethylene copolymers are mixed in the thermoplastic condition with polyisocyanates and expanding agents. It is advantageous to use temperatures which are from 10° to 100° C., particularly from 30° to 90° C., above the crystallite melting point of the polymer. The mixtures are kept under pressures which are higher than the pressure of the expanding agent at the mixing temperature so that the expanding agent is always in liquid phase under the mixing conditions. "Pressure of the expanding agent" is the vapor pressure of the expanding agent above the molten copolymer. The mixtures are decompressed in a homogeneous condition after the end of the mixing operation, i.e. they are brought into a zone in which the pressure is lower than the pressure of the expanding agent at the mixing temperature. It is most advantageous to decompress the mixture in a zone which is under atmospheric pressure. It is advantageous to use continuous mixing equipment to prepare the mixture. Extruders (screw extruders) have proved to be particularly suitable. The dimensions of the mixing equipment are chosen so that by the time the mixture of ethylene copolymer, additives and expanding agent leaves the mixing zone and enters the decompression zone, it is homogeneous. The mixtures may also be prepared in batch equipment, for example in stirred autoclaves. Expanded plastics having different shapes can be obtained by the process according to the invention. Thus for example continuous sections of expanded plastics, boards, blown film or sheeting or tubes can be obtained. The process is also suitable for sheathing articles with expanded plastics.

Open cell, closed cell or partly open cell and partly closed cell foams can be obtained depending on the degree of crosslinking and the temperature of the homogeneous mixture of copolymer, polyisocyanate and expanding agent. In order to prepare open cell foam, the homogeneous mixture, immediately prior to extrusion, is brought to a temperature which is between the crystallite melting point and 20° C. below the same. If the mixture is kept at a temperature of at least 30° C. below the crystallite melting point, closed cell foam is obtained. High degrees of crosslinking, for example 30%, promote the formation of open cell foams and low degrees of crosslinking, for example from 10% to 30%, promote the production of closed cell foams.

The process has special importance for the production of particulate expanded plastics. These may be obtained for example by continuous extrusion of the mixture to be expanded and breaking up the mixture prior to expansion. With liquid expanding agents, particles having diameters of from 3 to 20 mm. whose density is more than 8 grams per liter, preferably from 10 to 40 grams per liter, may be obtained by the process. With solid expanding agents, materials having a density of 100 to 600 grams per liter are obtained. Such particles may be used for example as cushion-stuffing materials, insulating materials or soil conditioners. Boards or sheeting prepared by fusing the particles together may serve as thermal or sound insulation.

The expanded plastics obtained according to the process have a gel content which may be from 10 to 70%. The gel content is the insoluble fraction which is determined for example by dissolving the polymer in decahydronaphthalene at temperatures of 140° C. The expanded plastics obtained have a thermal stability which is 20° to 30° C. higher than that of expanded plastics which have been prepared merely from the copolymers. It is surprising that the mixtures to be expanded according to the invention can be extruded through dies and expanded in spite of the high gel content. In comparable expansion methods in which for example ethylene polymers are crosslinked with peroxides, it is only possible to extrude through a die and expand mixtures which have a gel content of 5 to 7%. When the gel content is higher than this, processing is not possible by this method.

The invention is illustrated by the following examples. The parts specified in the examples are parts by weight.

EXAMPLE 1

100 parts of a copolymer of 85 parts of ethylene and 15 parts of tert-butyl acrylate is mixed with 3 parts of talc and 2 parts of diphenylmethane-4,4'-diisocyanate. 12 parts of this mixture is plasticized in a twin screw extruder while metering in 2.5 parts of a 50:50 mixture of isobutane and n-butane. The residence time in the extruder is 2½ minutes, the maximum temperature is 160° to 170° C. The homogeneous mixture of polymer and expanding agent is extruded through a circular die having a diameter of 3 mm. The expanding closed cell extrudate is broken up into particles by a hot granulator.

The particles have a diameter of 15 to 20 mm. and a gel content of 15%. Their thermal stability is 120° to 125° C.

An expanded product prepared without diisocyanate has a thermal stability of only 90° C.

The crosslinked particles may be fused together (after superficial heating with hot air to 108° C.) in a press to form a block having a density of 22 grams per liter. In the case of foam particles which have not been crosslinked, a marked shrinkage of the particles takes place because of defective thermal stability and a block prepared therefrom has a considerably higher density of 100 grams per liter.

EXAMPLE 2

100 parts of a copolymer of 85 parts of ethylene, 6.5 parts of tert-butyl acrylate and 8.5 parts of acrylic acid are mixed with 3 parts of talc and 2 parts of naphthylene-1,5-diisocyanate. 60 parts of the mixture is plasticized per hour in an extruder and 12 parts of an expanding agent mixture (consisting of 90 parts of isobutane and 10 parts of dichlorodifluoromethane) is incorporated. Open cell expanded strands extruded through a circular die having a large number of 3 mm. orifices, the temperature of the strands shortly after expansion being at about the crystallite temperature, are cooled and granulated to form an open cell material in the form of flake. This is suitable as a soil conditioner because of its high water absorptivity of 500% of its own weight. The gel content, measured on the finished expanded material, is 66%.

EXAMPLE 3

100 parts of a mixture of 80 parts of an ethylene-vinyl acetate copolymer (containing 8 parts of copolymerized units of vinyl acetate) and 20 parts of polyisobutylene is mixed with 0.5% of azodicarboxamide as a nucleating agent and 1 part of triphenylmethane-4,4',4''-triisocyanate. The mixture is plasticized and homogenized in a single screw extruder provided with homogenizing attachment while metering in 20 parts of an expanding agent mixture of 70 parts of isobutane and 30 parts of neopentane, and extruded through a multihole die.

The extrudate is broken up by a granulator attached directly to the die.

At an extrusion temperature ol 170° C. in the homogenizing zone and a residence time of twenty minutes, the expanded particles have a gel content of 20%. The thermal stability is about 25° C. above the value determined on expanded material which has been obtained without diisocyanate.

EXAMPLE 4

100 parts of a terpolymer of 85 parts of ethylene, 10 parts of ethyl acrylate and 5 parts of acrylic acid is mixed with 2% by weight of talc and 0.2% by weight of azodicarboxamide.

100 kg. of this mixture is plasticized per hour in a single screw extruder with a dwell extruder ahead of it and with the addition of 3 kg. of 2,4-toluylene diisocyanate, the isocyanate being dissolved in liquid isobutane in such concentration that 1.5% by weight of diisocyanate (with reference to the starting product) is incorporated per hour into the 20 kg. of expanding agent metered in.

At a residence time of twenty minutes and a peak temperature of 165° C., a gel content of 30% is achieved. The crosslinked melt containing expanding agent, which is under pressure, is brought to a temperature which is about 30° C. below the crystallite melting point of the polymer prior to extrusion. When using a sheeting die having the dimensions 3 mm. x 200 mm., closed cell foam sheeting is obtained having the dimensions 1.5 cm. x 80 cm. and a density of 25 grams per liter.

The thermal stability is about 20° to 25° C. above that of foam prepared without adding diisocyanate.

EXAMPLE 5

100 parts of a terpolymer of 80 parts of ethylene, 10 parts of n-butyl acrylate and 10 parts of acrylic acid is introduced through a gear pump in the molten state into a stirred pressure vessel and homogenized therein with 3 parts of talc, 2.5 parts of diphenylmethane-4,4'-diisocyanate and 15 parts of an expanding agent mixture of 50 parts of isobutane, 40 parts of propane and 10 parts of neopentane. The residence time in the vessel is twenty-five minutes and the temperature is 170° C.

The homogeneous mixture having a gel content is then conveyed through a cooled pipe by means of another gear pump having a capacity of 60 liters per hour to a circular die having a diameter of 10 mm. and there decompressed at a temperature which is 12° C. below the melting point of the starting polymer. Continuous sheeting 60% of whose cells are closed and having a diameter of 80 mm. is formed.

The density is 25 grams per liter and the gel content is 25 to 30%.

The thermal stability is 30° C. higher than that of foam prepared from starting polymer which has not been crosslinked.

EXAMPLE 6

100 parts of a mixture consisting of 90 parts of a copolymer of 85% by weight of ethylene and 15% by weight of n-hexyl acrylate, and 10 parts of polypropylene is mixed with 3% of talc as a nucleating agent and 4% by weight of naphthylene-1,5-diisocyanate and 60 kg. per hour of the mixture is plasticized and homogenized in a twin screw extruder while metering in 12 kg. per hour of methyl chloride at a residence time of five minutes and an extruder temperature of 170° C.

The melt containing expanding agent, which is under pressure, has a gel content of 40%. It is released from pressure at a temperature which is 25° C. below the crystallite melting point of the ethylene copolymer by passing it through a sheeting die having the dimensions 0.3 mm. x 200 mm. Closed cell foam sheeting is obtained having a cross-section of 1 mm. x 700 mm.

The tensile strength of this material in the longitudinal direction is about 10 kg./cm.² and in the transverse direction is 4 kg./cm.².

The thermal stability is 120° C. The material is suitable as a substitute for blankets in furniture transport.

EXAMPLE 7

100 parts of a copolymer of 90 parts of ethylene and 10 parts of tert-butyl acrylate are mixed with 2 parts of azodicarboxamide, 5 parts of zinc oxide, 3 parts of talc and 2 parts of diphenylmethane-4,4'-diisocyanate. 20 parts of the mixture is plasticized per hour in a single screw extruder fitted with an attachment for sheathing cable. The temperature is controlled so that decomposition of the solid expanding agent takes place near to the die. The gas dissolved in the melt which is under pressure escapes upon flashing into a zone of lower pressure, and a sheath of foam 1.5 mm. in thickness and having a density of 100 grams per liter forms around the cable. The gel content of the foam is 30%.

EXAMPLE 8

100 parts of a mixture of 90 parts of a copolymer of vinyl acetate/ethylene copolymer and 15% by weight of vinyl acetate, and 10 parts of polybutene is plasticized with 2 parts of p,p'-oxybenzenesulfohydrazide and 1.5 parts of naphthylene-1,5-diisocyanate in an extruder and passed through a die for blown film. The foam (crosslinked to the extent of 20%) formed is blown to an expanded very soft film having a thickness of 500 microns and a density of 80 grams per liter.

We claim:
1. A process for the production of thermally stable expanded plastics which are soft and elastomeric which comprises: mixing (1) thermoplastic ethylene copolymers containing at least 60% by weight of polymerized units of ethylene and containing polymerized units of esters of unsaturated acids which are copolymerizable with ethylene, said esters being derived from alcohols having 1 to 20 carbon atoms, and said ethylene copolymers in addition to said esters containing from 10 to 20% by weight of polymerized units of said unsaturated acids with (2) a polyisocyanate and (3) an expanding agent at a pressure above the pressure of said expanding agent at the mixing temperature, whereby the expanding agent is maintained in a liquid state under the mixing conditions, to produce a homogeneous mixture, and thereafter decompressing said mixture by passing said mixture to a zone in which the pressure is lower than the pressure of the expanding agent at the mixing temperature, said mixing temperature being from 10° to 100° C. above the crystallite melting point of said copolymers.

2. A process as claimed in claim 1 wherein mixing is carried out at a temperature of more than 150° C.

3. A process as claimed in claim 1 wherein the ethylene copolymer contains 5 to 10% of polymerized units of acrylic acid and 5 to 10% of polymerized units of tert-butyl acrylate.

4. A process as claimed in claim 1 wherein the ethylene copolymer is mixed with 0.5 to 5% by weight of polyisocyanate with reference to the weight of copolymer.

5. A process as claimed in claim 4 wherein the said percentage is from 1 to 2% by weight.

6. A process as claimed in claim 1 wherein the polyisocyanate used is 4,4' - dicyclohexylmethane diisocyanate.

7. A process as claimed in claim 1 wherein the polyisocyanate used is 3,3'-dimethyl-4,4'-dicyclohexylmethane diisocyanate.

8. A process as claimed in claim 1 wherein said temperature is from 30° to 90° C. above the crystallite melting point of the copolymer.

9. A process as claimed in claim 1 wherein mixing is carried out in an extruder.

10. A process as in claim 1 wherein said unsaturated acid is selected from the group consisting of acrylic acid, crotonic acid, fumaric acid, and maleic acid.

References Cited
UNITED STATES PATENTS

| | | | |
|---|---|---|---|
| 3,067,147 | 12/1962 | Rubens et al. | 260—2.5 E |
| 3,200,089 | 8/1965 | Landler et al. | 260—2.5 |
| 3,267,051 | 8/1966 | Landler et al. | 260—2.5 |
| 3,452,123 | 6/1969 | Beckmann et al. | 260—2.5 E |

MURRAY TILLMAN, Primary Examiner

M. FOELAK, Assistant Examiner

U.S. Cl. X.R.

260—41, 77.5 R, 77.5 CR, 80.8, 86.7, 896, 897